(12) United States Patent
Sastry (10) Patent No.: US 11,620,916 B1
(45) Date of Patent: Apr. 4, 2023

(54) MACHINE LEARNING METHOD AND SYSTEM FOR AN ON-LINE COURSE

(71) Applicant: Amesite Inc., Ann Arbor, MI (US)

(72) Inventor: Ann Marie Sastry, Ann Arbor, MI (US)

(73) Assignee: Amesite Inc., Ann Arbor, MI (US)

( * ) Notice: Subject to any disclaimer, the term of this patent is extended or adjusted under 35 U.S.C. 154(b) by 268 days.

(21) Appl. No.: 17/016,072

(22) Filed: Sep. 9, 2020

Related U.S. Application Data (60) Provisional application No. 62/897,863, filed on Sep. 9, 2019.

(51) Int. Cl.
| | |
|---|---|
| G09B 5/00 | (2006.01) |
| G06F 40/205 | (2020.01) |
| G06Q 50/20 | (2012.01) |
| G06N 3/02 | (2006.01) |
| G06F 40/30 | (2020.01) |

(52) U.S. Cl.
CPC ............. G09B 5/00 (2013.01); G06F 40/205 (2020.01); G06F 40/30 (2020.01); G06N 3/02 (2013.01); G06Q 50/205 (2013.01)

(58) Field of Classification Search
CPC ........ G09B 19/003; G09B 23/28; G09B 5/06; G09B 9/00
See application file for complete search history.

(56) References Cited

U.S. PATENT DOCUMENTS

| | | | |
|---|---|---|---|
| 2017/0213469 A1* | 7/2017 | Elchik | ...................... G09B 7/02 |
| 2017/0323577 A1* | 11/2017 | Elchik | ..................... G09B 19/04 |
| 2018/0261118 A1* | 9/2018 | Morris | ..................... G09B 7/02 |
| 2019/0139432 A1* | 5/2019 | Jain | ......................... G06T 13/80 |
| 2019/0385470 A1* | 12/2019 | Le Chevalier | ...... G06F 16/9535 |
| 2020/0090537 A1* | 3/2020 | Le Chevalier | ........ A63F 13/825 |

* cited by examiner

*Primary Examiner* — Nathan Hillery
(74) *Attorney, Agent, or Firm* — Richard T. Ogawa; Ogawa P C.

(57) ABSTRACT

The invention provides a method and system for using a machine learning technique for identifying and outputting most relevant articles for a learning program.

17 Claims, 9 Drawing Sheets

$$w_{i,j} = tf_{i,j} \times \log\left(\frac{N}{df_i}\right)$$

$tf_{i,j}$ = number of occurrences of $i$ in $j$
$df_i$ = number of documents containing $i$
$N$ = total number of documents

- Tf-idf is a numerical statistic that reflects how important a word is to a document amongst a corpus.

- We run Tf-idf over all documents so that now for each document vector $\partial$, the $i^{th}$ value of $\partial$ is the tf-idf score for the $i^{th}$ word in the document

- Each document, $\partial$, is comprised of a set of words.
- We have a collection of documents $D$. In $D$, there are $n$ unique words.
- For the vector space model, this means that each document can be represented as an element of an $n$-dimensional vector space, where the $i^{th}$ value of $\partial$ is the number of occurrences of the $i^{th}$ unique word in $D$.

Figure 7

- We use Non-Negative Matrix Factorization (NMF) to do feature extraction on the corpus.

- NMF works by creating a low-rank approximation of the corpus V resulting in two matrices W and H such that $V \approx WH$. The rank of W is significantly lower than that of D and we can think of its columns as being a basis of D.

- Each column vector of W is an approximation of the ideal set of words which comprise a document.

- We hand curate the list of words returned by the NMF and make a new document out of them

Figure 8

- Tf-idf is a numerical statistic that reflects how important a word is to a document amongst a corpus.

- We run Tf-idf over all documents so that now for each document vector $\partial$, the $i^{th}$ value of $\partial$ is the tf-idf score for the $i^{th}$ word in the document

$$w_{i,j} = tf_{i,j} \times \log\left(\frac{N}{df_i}\right)$$

$tf_{i,j}$ = number of occurrences of $i$ in $j$
$df_i$ = number of documents containing $i$
$N$ = total number of documents

Figure 9

- Using the tf-idf scored vectors for each document, we calculate the cosine similarity between each document vector and the document composed of the words returned from the NMF feature extraction
- This ranks the articles and we then serve up the top 10 each week to the instructor for sharing

MACHINE LEARNING METHOD AND SYSTEM FOR AN ON-LINE COURSE

CROSS-REFERENCE TO RELATED PATENT APPLICATIONS

This application is a Nonprovisional of and claim priority to U.S. Patent Application Ser. No. 62/897,863, filed on Sep. 9, 2019, commonly assigned and incorporated by reference herein for all purposes.

BACKGROUND OF INVENTION

The present invention relates generally to processing techniques for course materials. In particular, the invention provides a method and system for using a machine learning technique for identifying and outputting most relevant articles for a learning program. Merely by way of example, the invention has been applied to a mobile computing device configured to a world wide network of computers, however, the invention has many other applications.

"Education is the process of facilitating learning, or the acquisition of knowledge, skills, values, beliefs, and habits. Educational methods include storytelling, discussion, teaching, training, and directed research. Education frequently takes place under the guidance of educators, but learners may also educate themselves. Education can take place in formal or informal settings and any experience that has a formative effect on the way one thinks, feels, or acts may be considered educational. The methodology of teaching is called pedagogy. " https://en.wikipedia.org/wiki/Education.

Education originally occurred through a one by one basis between teacher and student or master and apprentice or partner and associate. Classrooms eventually took over to teach children in masses from pre-school to higher education. Most recently, education has been implemented on-line via the Internet to facilitate learning for students. Although education has progressed, it is desired that techniques to overcome difficulties in education, and more particularly learning are desired.

SUMMARY

According to the present invention, techniques related to course materials. In particular, the invention provides a method and system for using a machine learning technique for identifying and outputting most relevant articles for a learning program. Merely by way of example, the invention has been applied to a mobile computing device configured to a world wide network of computers, however, the invention has many other applications.

In an example, the present invention provides a system for real time knowledge of current events, e.g., periodicals, online feeds. In an example, the system has a network of computers interconnect to another to form a world wide network of computers. The system has a processing unit coupled to the network of computers using a communication bus. In an example, the system has an information storage system coupled to the network of computers and the processing unit. In an example, the information storage system comprises a plurality of documents, including press releases, text books, magazine articles, bulletins, web pages, white papers, and other informational documents. The system has a learning management system coupled to the network of computers. In an example, the learning management system comprises a program related to a topic for a course. In an example, the program comprises a plurality of pre-defined templates for the course, and a plurality of non-defined templates for the course. In an example, the system has a learning content robot coupled to the information storage system, the learning content robot comprising an artificial intelligence processing engine. In an example, the artificial intelligence processing engine comprises a natural language processing engine coupled to the information storage system. In an example, the natural language processing system is configured to search the information storage system using a key word or a pattern of key words for the topic, parse information derived from the search; process the parsed information using a neural network, having a plurality of weighing factors associated with the topic, select a document based upon the process of the parsed information; and transfer the selected document to the learning management system. In an example, the system has a configuration engine provided in the learning management system to populate the non-defined template with the selected document for the course to create a currently defined template using the selected document for the topic.

In an example, the present invention provides a method for using learning content robot coupled to an information storage system. The method includes processing a plurality of documents from an information management system using a learning content robot and using an artificial intelligence processing engine comprising a natural language processing engine coupled to the information storage system to search the information storage system using a key word or a pattern of key words for a selected topic. The method includes parsing information derived from the search, processing the parsed information using a neural network, having a plurality of weighing factors associated with the topic, selecting a document from the plurality of documents based upon the process of the parsed information, and transferring the selected document to a learning management system.

The system can be combined with other methods and systems such as those described in U.S. Ser. Nos. 16/252,409, filed Jan. 18, 2019; 16/254,316, filed Jan. 22, 2019; 16/268,282, filed Feb. 5, 2019; and 16/264,560, filed Jan. 31, 2019; each of which are incorporated by reference herein.

In an example, the present invention provides a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface coupled to the processing device. In an example, the network interface is configured to couple to a world wide network of computers or a local network of computers. The apparatus has a memory resource coupled to the processing device and an application comprising a course module. In an example, the course module comprises a plurality of templates and at least one video file, and processes, each of which may be desirably tailored to a user based upon feedback from various processing modules.

In an example, the apparatus has an image capturing device coupled to the housing and configured to the processing device. In an example, the image capturing device is configured to capture an image of at least a facial expression in a first format of the user while interacting with the course module. The image capturing device can be a high-resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In various embodiments, the apparatus may include a mixed reality or virtual reality headset that captures the user data using sensors from within a headset (e.g. Microsoft HoloLens and Mixed Reality platform, Magic Leap platform, Google Daydream, etc.) or that captures user data from a headset using external sensors, (e.g. HTC Vive, Oculus Rift) Various embodiments of headsets may provide spatial orientation data including where the user is viewing within an image (e.g. a lecturer, white board, etc.), where they are gazing within an image (e.g. equation, graph or diagram, etc.), duration of time viewing materials (e.g. reading a slide, or .pdf, etc.); voice data (e.g. a user repeating a foreign language phrase); and the like.

In an example, the apparatus has a natural language processor configured for processing information from the text information while the user is interacting with the course module. In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1-N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives.

In an example, the apparatus has an output handler coupled to the output of the neural network module, the output handler configured to provide feedback to the user. The feedback comprises a plurality of characteristics to allow the user to achieve a predetermined score within a range for the course.

The above examples and implementations are not necessarily inclusive or exclusive of each other and may be combined in any manner that is non-conflicting and otherwise possible, whether they be presented in association with a same, or a different, embodiment or example or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above examples implementations are illustrative, rather than limiting.

DETAILED DESCRIPTION OF THE SPECIFIC EXAMPLES

According to the present invention, techniques related to course materials. In particular, the invention provides a method and system for using a machine learning technique for identifying and outputting most relevant articles for a learning program. Merely by way of example, the invention has been applied to a mobile computing device configured to a world wide network of computers, however, the invention has many other applications.

In an example, in order to assist a reader of the present specification, the following definitions are provided.

"Product" means a program of learning, including access to the present computing platform; content prepared using the present robot or other entity for configuring a current publication with the product; teaching, curation, or learning assistance services for the Product.

"Partner" means an entity with a business relationship with the system that delivers the Product and shares branding with system.

"Learner" means a human agent who purchases and uses the Product.

"Offeror" means a Partner with or through the system delivers a

Product. In an example, the Offeror provides certain services, including registration, billing, access to instructional staff, ongoing professional or educational accreditation, business experience and/or credentials, or other elements. In an example, the system may be the Offeror of some of its own Products.

"Instructional Staff" means human agents employed by Offeror. In an example, the system or one or more partners who provide teaching, curation, tutoring, discussion or coaching services to Learners using a Product.

"Learning Content Optimization Robot (LCOR)" means a robot device including one or more engines that couples to the information storage system, and learning management system. The LCOR can use artificial intelligence, machine learning, and natural language techniques.

Further details of the present examples can be found through out the present specification and more particularly below.

Figure 1:
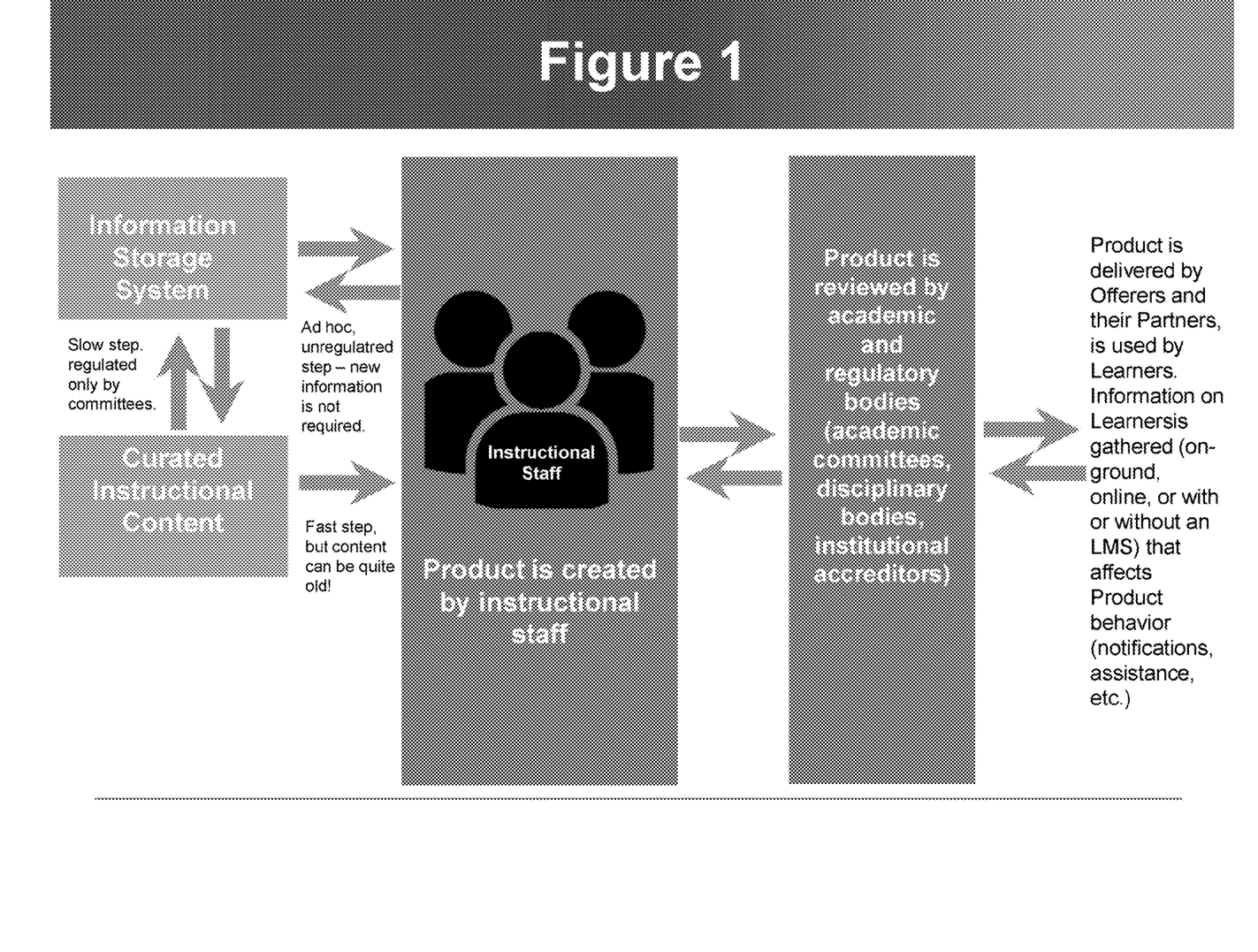
FIGS. 1 through 9 are simplified diagrams of a method and system for using robots and machine learning for facilitating an on-line course for a learning application according to an example.

FIG. 1 is a simplified block diagram illustrating a process for learning using conventional learning systems. As shown, the convention process has an information storage system. The content is curated by an instructional staff. The content is often ad hoc, unregulated, and new information is not required. Once the content is created for a product for a course. The product is often reviewed by academic and regulatory bodies. The product is delivered by an offeror and their partners. In an example, learners use the product, and gives feedback from time to time. Further details of the present system and methods can be found throughout the present specification and more particularly below.

Figure 2:
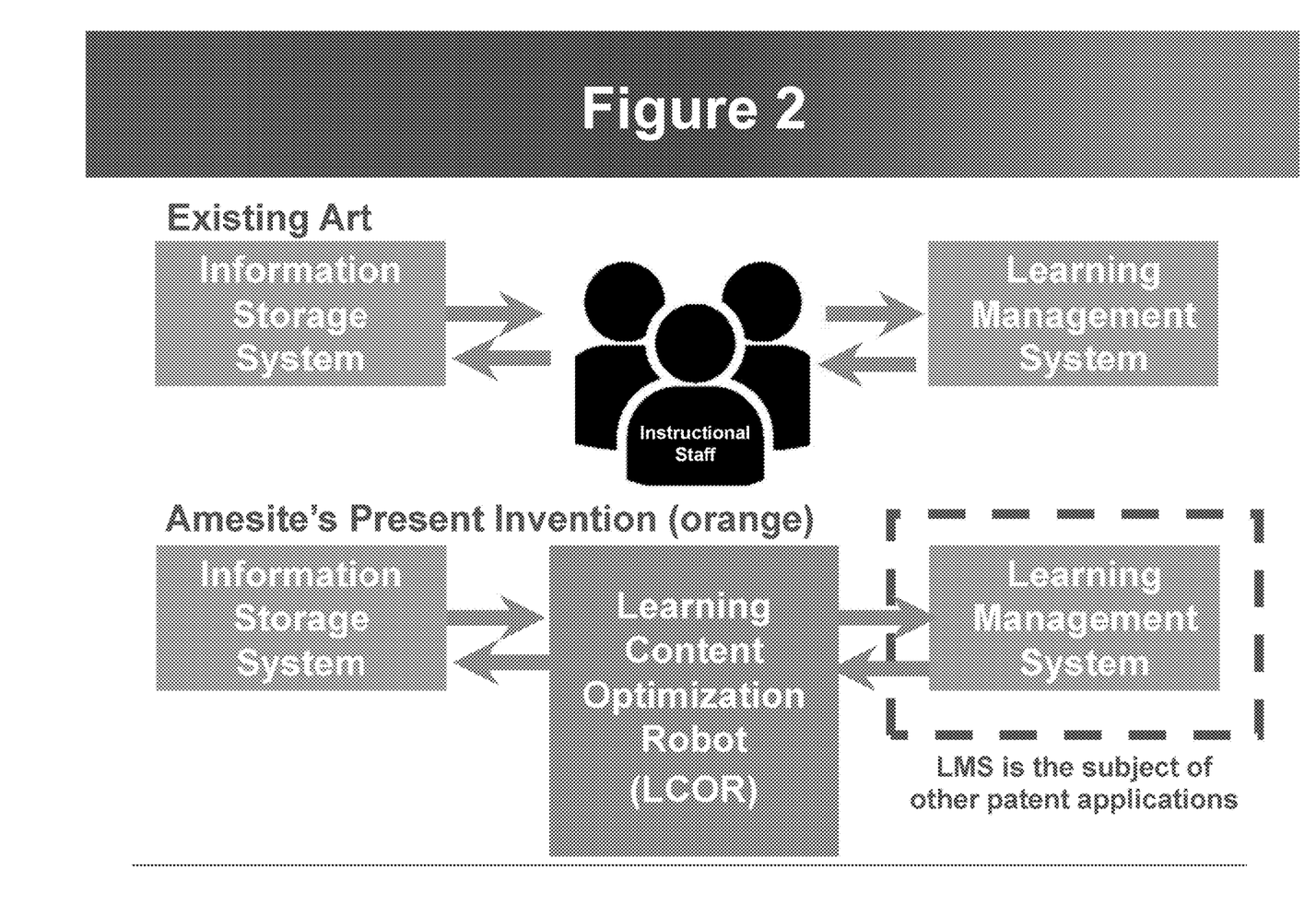

FIG. 2 is a simplified block diagram configured with a learning content robot according to an example of the present invention. In an example, the information management system is coupled to a learning content robot, which communicates to a learning management system.

Figure 3:
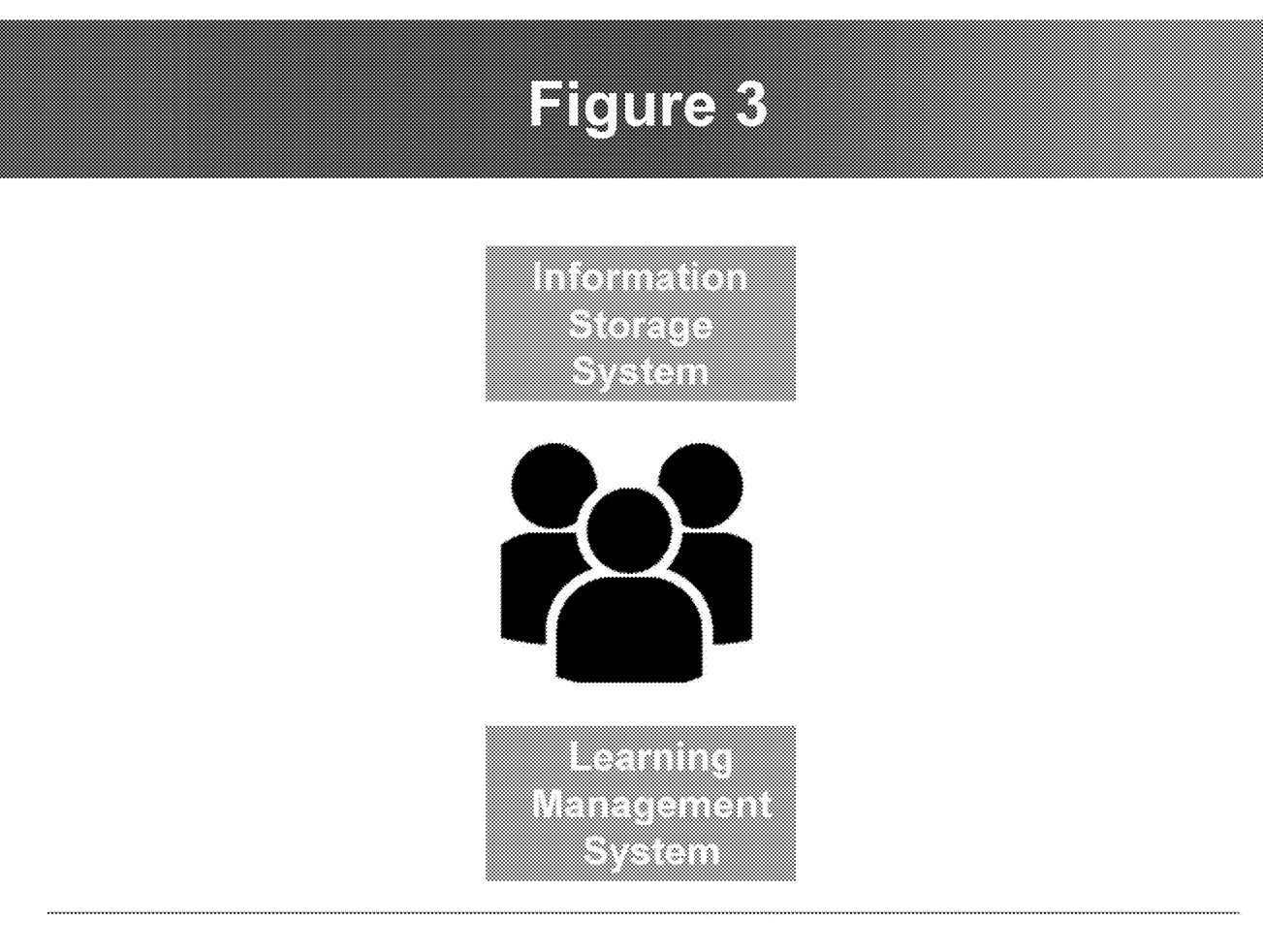

FIG. 3 is a simplified diagram of various elements in a process for learning according to an example. As shown, the process has various elements. In an example, an "Information Storage Systems" or ISS's is included. The ISS includes storage devices that have content holdings. In an example, the elements include publishers that sell databases of articles from popular, trade, scientific and other sectors as packages.

In an example, the ISS are commonly described as third-party acquisition systems. Examples of the systems include, but are not limited to, EBSCO, ProQuest, OverDrive, Project Muse, and JSTOR. In an example, the systems also include certain University Presses, who increasingly are removing the "middleman" and marketing their IP directly (see: https://www.insidehighered.com/news/2018/10/18/university-presses-take-control-ebook-distribution). Of course, there can be other variations, modifications, and alternatives.

In an example, the elements include instructional staff. The instructional staff selects course content, and from time to time incorporate current events, as part of lectures, discussions or formal lecture notes. Such selection is often ad hoc, and entirely at the discretion of the instructional staff, so long as content and delivery methods are in conformance with agreed-upon standards by the following communities/entities:

a. academic committees within an institution, typically at the department and college or school level and are conducted by committees who advise an administrator (UM's process is typical and listed here:
   https://www.provostumich.edu/programs/new_program_approval/approval/process.html);
b. regulatory or accrediting bodies that review curricula in certain disciplines, such as ABET, which accredits engineering programs (https://www.abet.org/); and
c. College or University-level accreditation, which is essential to nonprofits' ability to accept government support to students (e.g. Pell grants). Regional accreditation is more important in the US than "national" accreditation bodies (see:
   https://www.edsmartorg/regional-vs-national-accreditation/).

In an example, the system has learning management systems. In an example, the learning management systems are systems to store content and automate certain functions related to delivery of learning products. In an example, the systems include but are not limited to: storage of digital media, recording of certain user behaviors, issuance of notifications, calculation of grades, integration of certain operating functions (calculators, graphing tools, image processing tools, writing tools and editors and the like).

In an example, the learning management system comprises an artificial intelligence tools or engine to promote engagement and improved learner outcomes, and also reduce instructional time on administrative tasks, and also overall cost.

In an example, the present system has a learning content robot, which can be configured with any learning management system. Further details of the present system can be found throughout the present specification and more particularly below.

Figure 4:
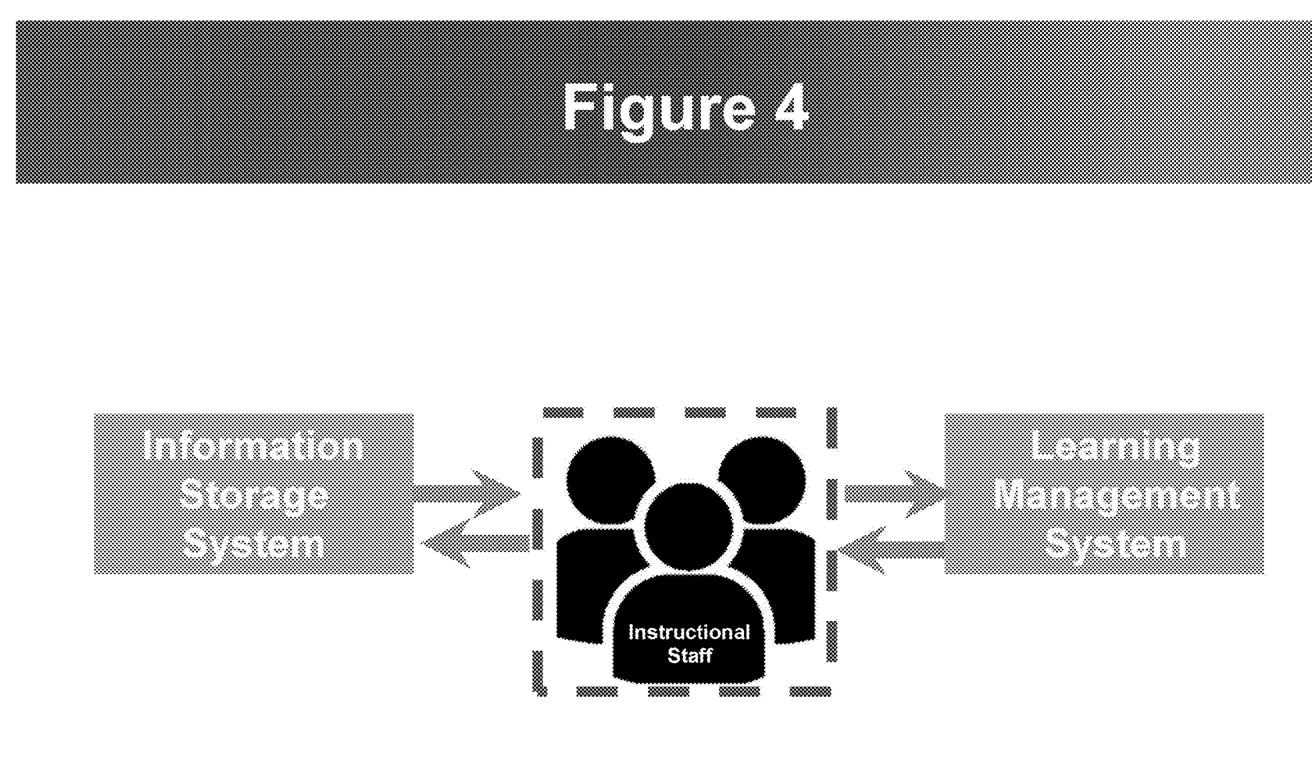

FIG. 4 is a simplified diagram of a conventional learning system and limitations of the conventional learning system. In an example, we discovered that there is no regulatory body has responsibility or interest in real-time integration of current events, new findings or other novel information, since all are focused on presently understood teaching norms, whose constructions predate modern search algorithms. Therefore, it is entirely ad hoc, and teaching products can be delivered with no integration of current knowledge. A present example—there is literally no requirement presently that biology teachers at any level in the U.S. immediately cease teaching that mitochondrial DNA are solely maternal, even though recent science has shown that it is both maternal and paternal (https://www.the-scientist.com/news-opinion/fathers-can-pass-mitochondrial-dna-to-children-65165).

As a result of the ad hoc nature of integration of presently searchable science and humanities findings into curricula, the process is slow, not-optimized and unavailable in the majority of products because is the domain of workers who are not charged with the responsibility and no principles have been developed to conduct searches related to certain discipline in an optimized fashion using modern computing hardware.

No machines exist to perform this search function as optimized for the purpose of improving the quality of human learning since search hardware is predicated on entirely different business models. In professional and academic search, hardware is deployed to enable searchers acting as individual agents find information related to certain disciplinary questions (e.g. legal databases used to find case law, or scientific searches used to provide background for new studies).

In an example, modern academic practice teaches away from integration of new information, by its organization of regulation and oversight as a slow, consensus-driven process that does not explicitly include new disciplinary findings in review of curricula. Modern learners are disadvantaged by the lack of machine solutions to this issue, since a machine is the only possible way to find relevant information quickly and accurately enough to include in courses while they are being offered.

In an example, the present method and related system provide a process for using machine learning to identify and output a desired quantity of articles to the Instructional Staff or other entity for the learning process. Further details of the present technique can be found throughout the specification and more particularly below.

Figure 5:
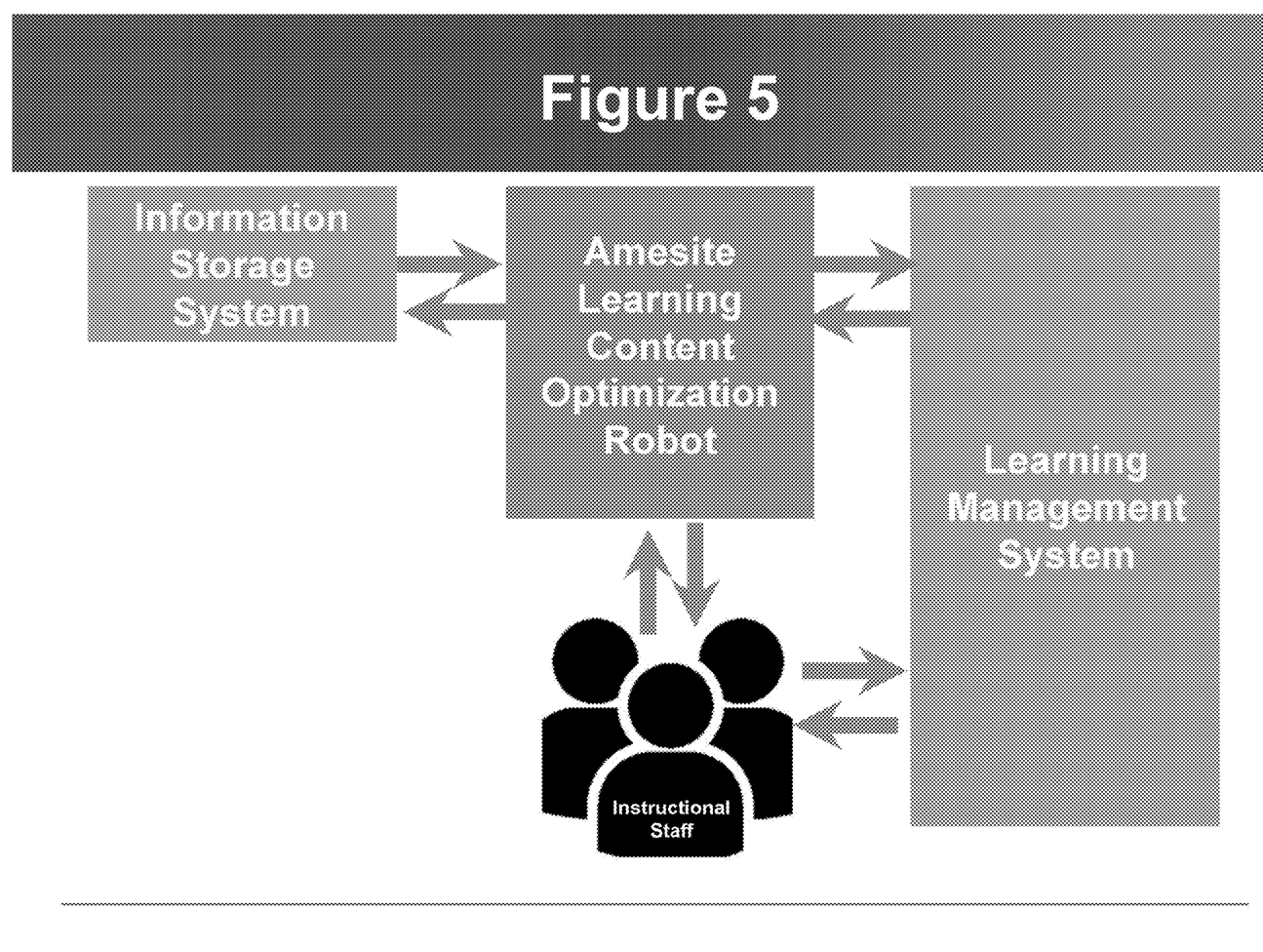

FIG. 5 is a simplified block diagram illustrating a process for learning with the learning content according to an example of the present invention.

Figure 6:
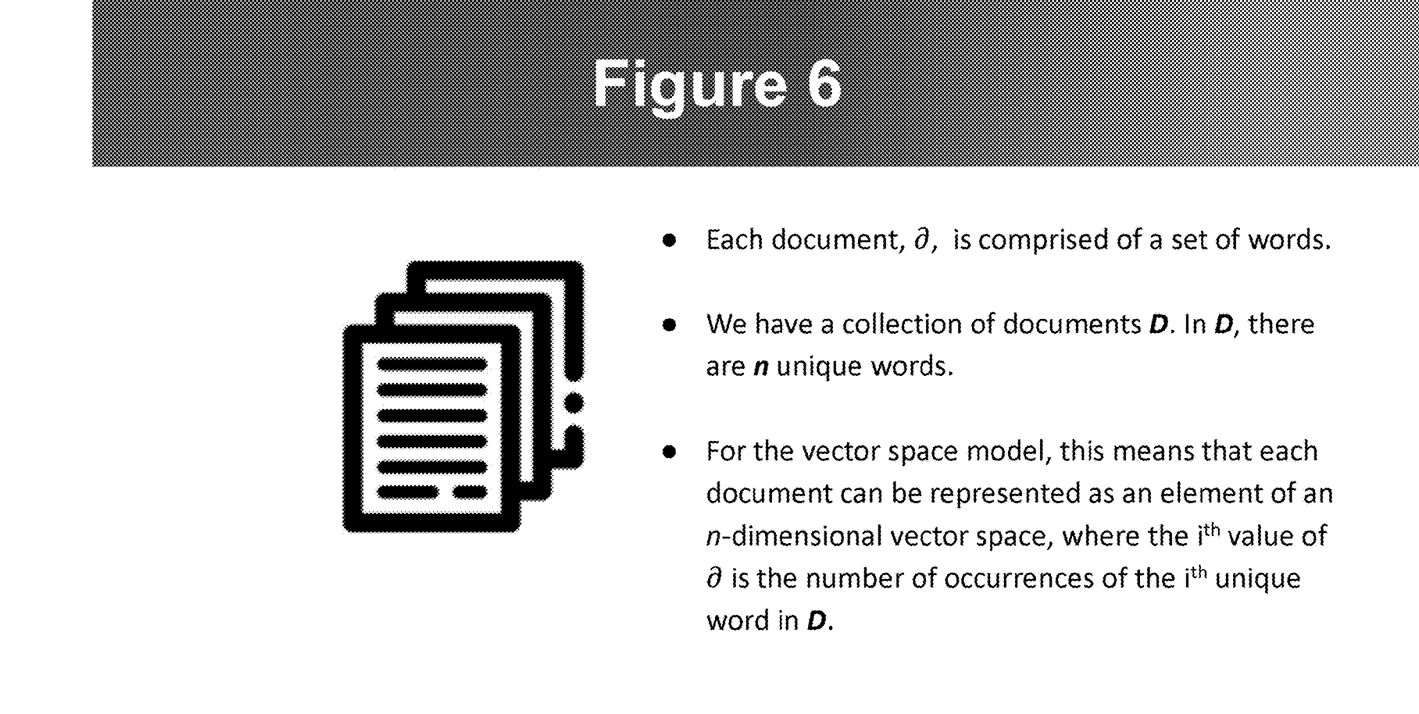

FIG. 6 is a simplified diagram of a machine learning process for a news feed according to an example of the present invention. As shown, each document comprises a set of words. A collection of documents has n unique words. Each document can be represented as an element of an n-dimensional vector space as shown.

Figure 7:
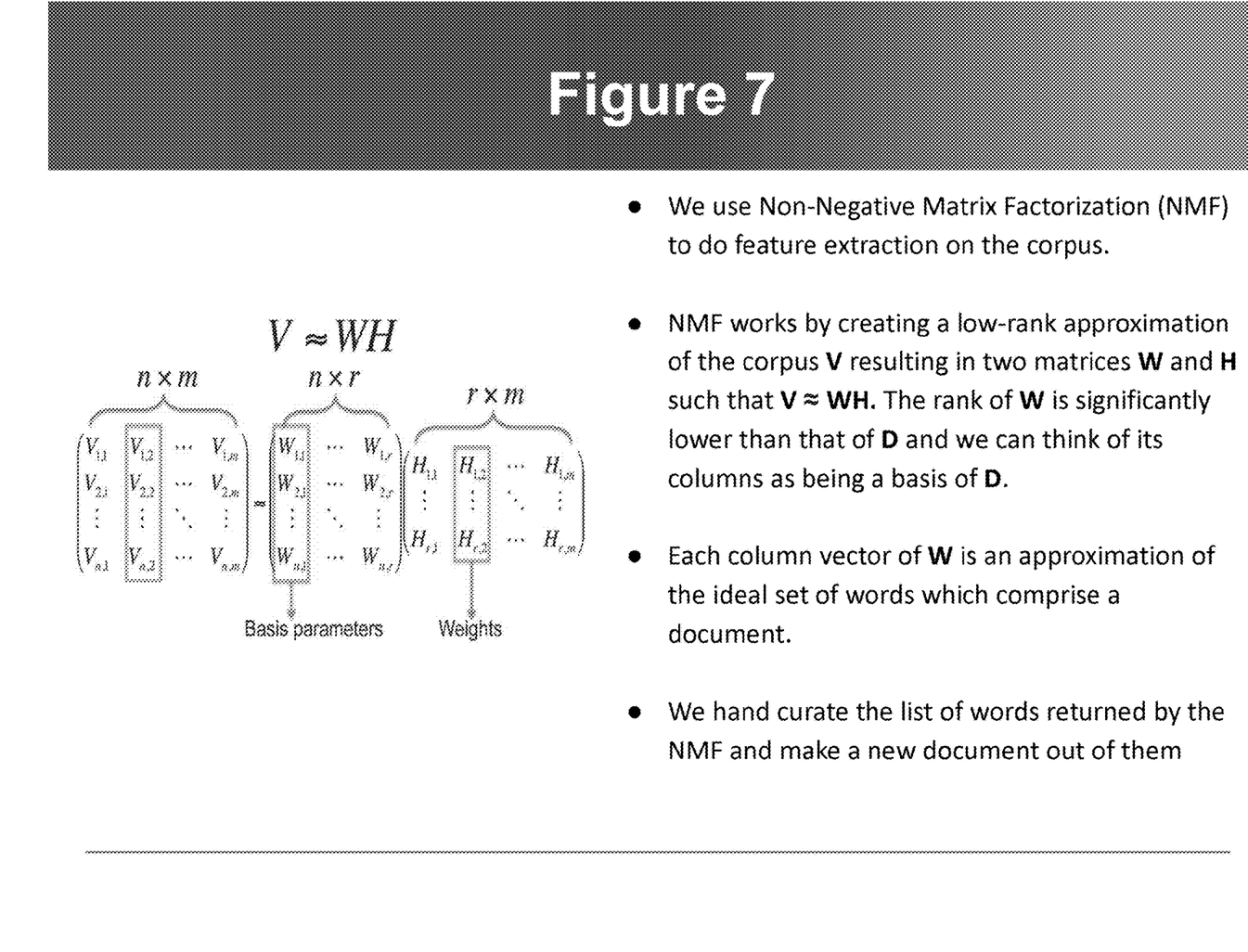

FIG. 7 is a simplified diagram of a machine learning process for a news feed according to an example of the present invention. In an example, the method uses Non-Negative Matrix Factorization (NMF) to do feature extraction on a corpus. In an example, NMF works by creating a low-rank approximation of the corpus V resulting in two matrices W and H such that $V \approx WH$. The rank of W is significantly lower than that of D and we can think of its columns as being a basis of D. In an example, each column vector of W is an approximation of the ideal set of words which comprise a document. In an example, the process also hand curates a list of words returned by the NMF and make a new document out of them.

Figure 8:
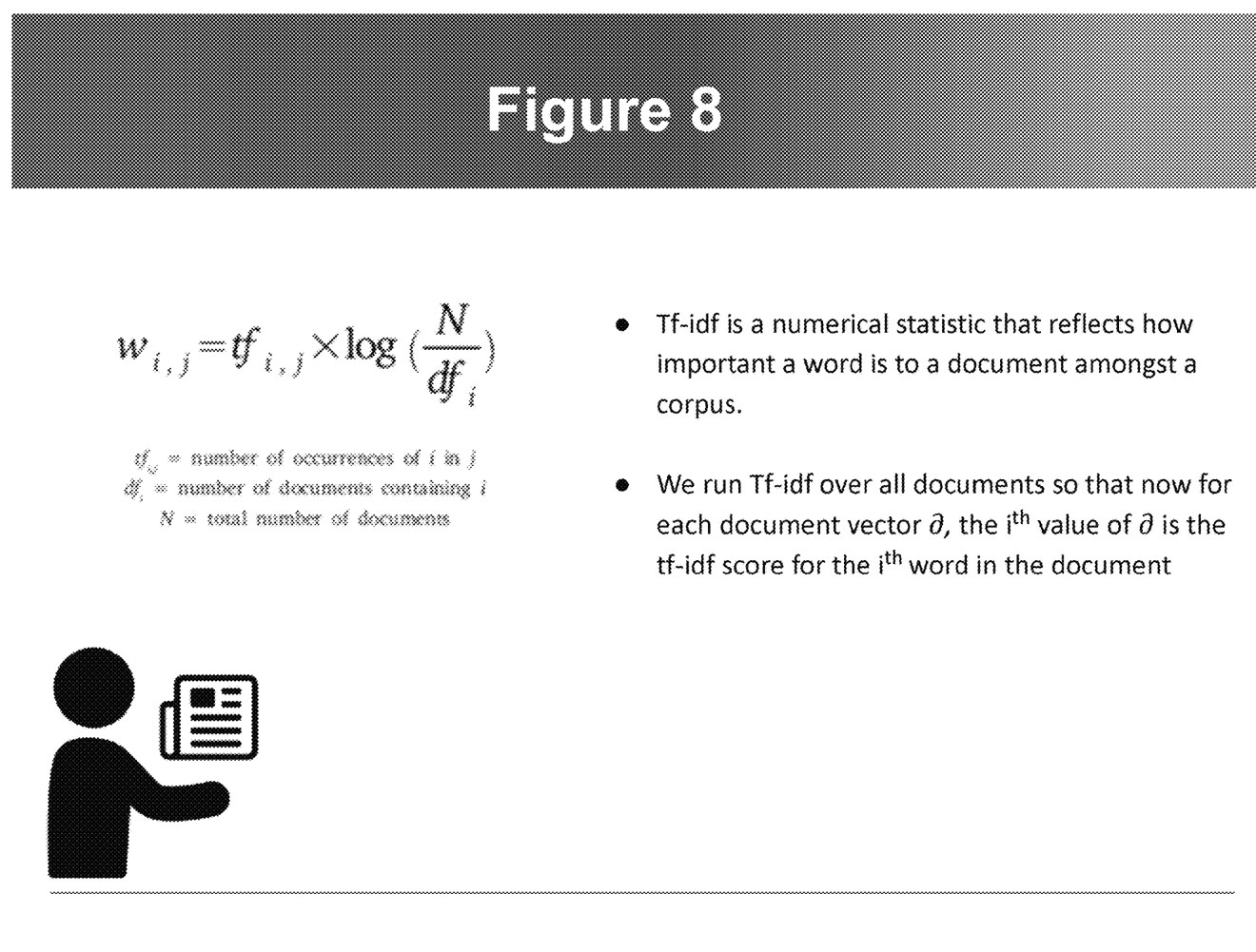

FIG. 8 is a simplified diagram of a machine learning process for a news feed according to an example of the present invention. As shown, term frequency—inverse document frequency (tf-idf) is a numerical statistic provided that reflects how important a word is to a document amongst a corpus. The numerical statistic is provided over all documents.

Figure 9:
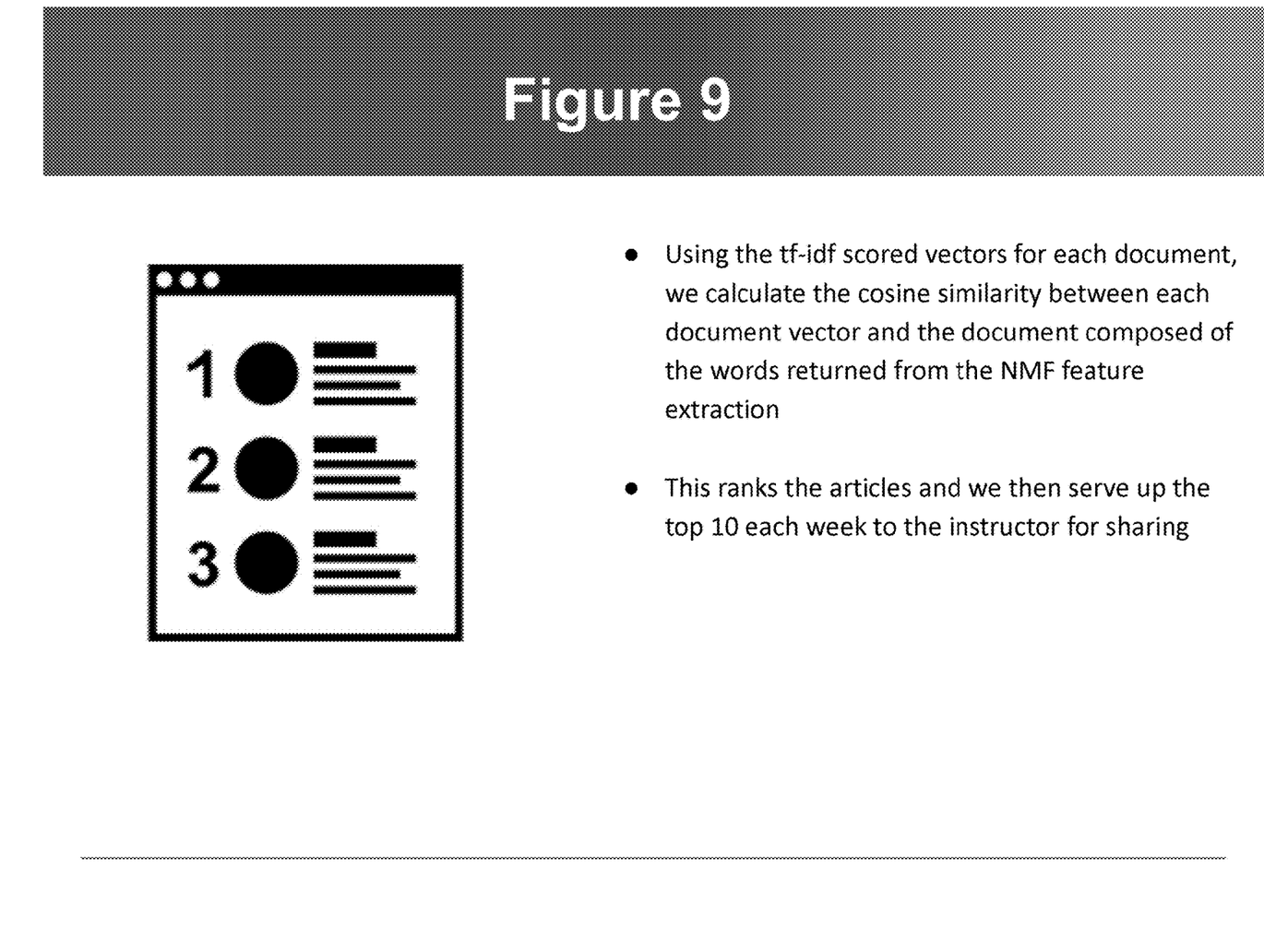

FIG. 9 is a simplified diagram of a machine learning process for a news feed according to an example of the present invention. Using the tf-idf scored vectors for each document, the process calculates the cosine similarity between each document vector and the document composed of the words returned from the NMF feature extraction. Next, the process ranks the documents and are served up the top 10 or other desired number each week to the instructor for sharing.

In an example, the present invention provides a method for using learning content robot coupled to an information storage system to create a program for a learning process within a pre-determined time period. In an example, the method includes within the pre-determined time period of twenty four hours, processing a plurality of documents from an information management system using a learning content robot, the plurality of documents being stored in one or more storage resources of an information storage system. In an example, the storage resources is coupled to a world wide network of computers. The method includes using an artificial intelligence processing engine comprising a natural language processing engine coupled to the information storage system to search the information storage system using a key word or a pattern of key words for a selected topic. In an example, the selected topic is related to the program for the learning process. The method includes parsing information, using a parsing engine, derived from the search and processing the parsed information using a neural network, having a plurality of weighing factors associated with the selected topic for the program; selecting a document from the plurality of documents based upon the process of the parsed information. The method includes transferring the selected document to a learning management system, the learning management system comprising the program related to the selected topic for a course. In an example, the program comprises a plurality of pre-defined templates for the course, and a plurality of non-defined templates for the course. The method includes populating the selected document into the non-defined template using a configuration engine for the course to create a currently defined template using the selected document for the topic; and presenting the program with the selected document to a user of the learning management system within the pre-determined time of twenty four hours.

In an example, the method further comprises a displaying the selected document before configuring the selected document into the non-defined template. The displaying provided on a display coupled to the learning management system. In an example, the selected document is a publication made within twenty four hours of processing the document using the learning content robot to provide for current information for the course. In an example, the learning content robot comprises a graphical processing unit configured with the natural language processing engine. In an example, the method further comprises storing the selected document in a memory cache configured to store a plurality of other selected documents in a temporary storage resource to be viewable in order of relevance from a highest relevance to a lowest relevance in association with the topic. Of course, there can be other variations, modifications, and alternatives.

In an example, various hardware elements of the invention can be implemented using a smart phone with a capture image of a user according to an embodiment of the present invention. As shown, the smart phone includes a housing, display, and interface device, which may include a button, microphone, or touch screen. Preferably, the phone has a high-resolution camera device, which can be used in various modes. An example of a smart phone can be an iPhone from Apple Computer of Cupertino California. Alternatively, the smart phone can be a Galaxy from Samsung or others.

In an example, the smart phone includes the following features (which are found in an iPhone from Apple Computer, although there can be variations), see www.apple.com, which is incorporated by reference. In an example, the phone can include 802.11b/g/n Wi-Fi (802.11n 2.4 GHz only), Bluetooth 2.1+EDR wireless technology, Assisted GPS, Digital compass, Wi-Fi, Cellular, Retina display, 5-megapixel iSight camera, Video recording, HD (720p) up to 30 frames per second with audio, Photo and video geotagging, Three-axis gyro, Accelerometer, Proximity sensor, and Ambient light sensor. Of course, there can be other variations, modifications, and alternatives.

An exemplary electronic device may be a portable electronic device, such as a media player, a cellular phone, a personal data organizer, or the like. Indeed, in such embodiments, a portable electronic device may include a combination of the functionalities of such devices. In addition, the electronic device may allow a user to connect to and communicate through the Internet or through other networks, such as local or wide area networks. For example, the portable electronic device may allow a user to access the internet and to communicate using e-mail, text messaging, instant messaging, or using other forms of electronic communication. By way of example, the electronic device may be a model of an iPod having a display screen or an iPhone available from Apple Inc.

In certain embodiments, the device may be powered by one or more rechargeable and/or replaceable batteries. Such embodiments may be highly portable, allowing a user to carry the electronic device while traveling, working, exercising, and so forth. In this manner, and depending on the functionalities provided by the electronic device, a user may listen to music, play games or video, record video or take pictures, place and receive telephone calls, communicate with others, control other devices (e.g., via remote control and/or Bluetooth functionality), and so forth while moving freely with the device. In addition, device may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device includes an enclosure or housing, a display, user input structures, and input/output connectors. The enclosure may be formed from plastic, metal, composite materials, or other suitable materials, or any combination thereof. The enclosure may protect the interior components of the electronic device from physical damage, and may also shield the interior components from electromagnetic interference (EMI).

The display may be a liquid crystal display (LCD), a light emitting diode (LED) based display, an organic light emitting diode (OLED) based display, or some other suitable display. In accordance with certain embodiments of the present invention, the display may display a user interface and various other images, such as logos, avatars, photos, album art, and the like. Additionally, in one embodiment, the display may include a touch screen through which a user may interact with the user interface. The display may also include various function and/or system indicators to provide feedback to a user, such as power status, call status, memory status, or the like. These indicators may be incorporated into the user interface displayed on the display.

In an embodiment, one or more of the user input structures are configured to control the device, such as by controlling a mode of operation, an output level, an output type, etc. For instance, the user input structures may include a button to turn the device on or off. Further the user input structures may allow a user to interact with the user interface on the display. Embodiments of the portable electronic device may include any number of user input structures, including buttons, switches, a control pad, a scroll wheel, or any other suitable input structures. The user input structures may work with the user interface displayed on the device to control functions of the device and/or any interfaces or devices connected to or used by the device. For example, the user input structures may allow a user to navigate a displayed user interface or to return such a displayed user interface to a default or home screen.

The exemplary device may also include various input and output ports to allow connection of additional devices. For example, a port may be a headphone jack that provides for the connection of headphones. Additionally, a port may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device may use the input and output ports to connect to and send or receive data with any other device, such as other portable electronic devices, personal computers, printers, or the like. For example, in one embodiment, the device may connect to a personal computer via an IEEE-1394 connection to send and receive data files, such as media files. Further details of the device can be found in U.S. Pat. No. 8,294,730, assigned to Apple, Inc.

In embodiments of the present invention, various uses of blockchain coding may provide authentication and verification of the education process. For example, course materials provided directly from an institution (e.g. lecturer, professor) or the modified course materials provided to the user using embodiments of the present invention may be encoded into a first block (not necessarily the ordinal first block) in a block chain. In various embodiments, the authentication may also include proof of accreditation of the course and/or the institution itself. In some embodiments, prior to hashing, the materials may be encoded with a provider private key. It is contemplated that the first block can help verify the materials provide to the user are genuine and authorized.

In some embodiments, education materials provided to the user are customized for each user, for example, by adding the user's name, address, student identifier, or the like to the documents, videos, etc. Accordingly, the blockchain hash of educational materials for different users should also be different. Such techniques are usable in embodiments where course materials are highly valuable, and only students who enroll in the course should be able to receive credit or certification for the course. In such cases, if a third-party attempts use the course materials without registering, the third party cannot receive accreditation for the course. This is because the block corresponding to the course materials in the third party's blockchain will not be authenticated with the third party's name.

Next, in various embodiments, if a user completes a course successfully, an additional block is added to the blockchain. The blockchain hash may be performed upon the student data (e.g. name, student ID, course, time, etc.), one or more certificates of completion, course information (e.g. institution name, professor name, course name, credit hours, etc.), grade, and the like. In various embodiments, the user may be authenticated by other means, such as social security number, private key, password, or the like. In various embodiments, the new block includes a hash of the previous block (e.g. proof that the education materials used were authorized) plus the hash of the above user information. As a result, the blockchain can be used to prove that the authorized user completed a specific course authorized by a specific accredited institution.

In various embodiments of the present invention, as a user repeats the above process for different courses, additional blocks are added to the blockchain. The blockchain thus can verify the user's credits, grades, etc.; can verify that the course was provided by an authorized institution, and can verify that the user was authorized to take the course. In various embodiments, various educational providers, educational institutions, and other distributed stakeholders by store blockchains geared towards educational achievements.

In some embodiments, transactions within the process described above may also include payment information. In various embodiments, payment information may be made using available coin offerings. In other embodiments, payment information may be made using a custom coin offering directed to education on all different levels, education from institutions of higher learning, offerings in conjunction with educational 529 plans, and the like. The inventor is not currently aware of such educationally-directed coin offerings, but believes they may be used in various embodiments of the present invention.

In an example, the invention also includes a method for a secure learning experience using a encrypted encoded network. The method includes configuring a course module information (e.g., user identification, course, pass or non-pass results, and other information) derived from an interactive course platform coupled to a server and a network. In an example, the course module comprises information provided from a human user coupled to a plurality of sensing devices, including at least an image capturing device, a motion sensor, and an ambient sensor. The method includes assigning a time and date stamp on the course module and processing the course module to validate it against a predetermined quality metric, coding format, and ratification information to configure a second course module in a canonical format. The method includes processing the course module in the second format using an encryption process and configuring the course module on a public ledge in a block chain configuration.

Having described various embodiments, examples, and implementations, it should be apparent to those skilled in the relevant art that the foregoing is illustrative only and not limiting, having been presented by way of example only. Many other schemes for distributing functions among the various functional elements of the illustrated embodiment or example are possible. The functions of any element may be carried out in various ways in alternative embodiments or examples.

Also, the functions of several elements may, in alternative embodiments or examples, be carried out by fewer, or a single, element. Similarly, in some embodiments, any functional element may perform fewer, or different, operations than those described with respect to the illustrated embodiment or example. Also, functional elements shown as distinct for purposes of illustration may be incorporated within other functional elements in a particular implementation. Also, the sequencing of functions or portions of functions generally may be altered. Certain functional elements, files, data structures, and so one may be described in the illustrated embodiments as located in system memory of a particular or hub. In other embodiments, however, they may be located on, or distributed across, systems or other platforms that are co-located and/or remote from each other. For example, any one or more of data files or data structures described as co-located on and "local" to a server or other computer may be located in a computer system or systems remote from the server. In addition, it will be understood by those skilled in the relevant art that control and data flows between and among functional elements and various data structures may vary in many ways from the control and data flows described above or in documents incorporated by reference herein. More particularly, intermediary functional elements may direct control or data flows, and the functions of various elements may be combined, divided, or otherwise rearranged to allow parallel processing or for other reasons. Also, intermediate data structures of files may be used and various described data structures of files may be combined or otherwise arranged.

In other examples, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A system for real time knowledge of current events, the system comprising:
    a network of computers interconnect to another to form a world wide network of computers;
    a processing unit coupled to the network of computers using a communication bus;
    an information storage system coupled to the network of computers and the processing unit, the information storage system comprising a plurality of documents;
    a learning management system coupled to the network of computers, the learning management system comprising a program related to a topic for a course, the program comprising a plurality of pre-defined templates for the course, and a plurality of non-defined templates for the course;
    a learning content robot coupled to the information storage system, the learning content robot comprising an artificial intelligence processing engine, the artificial intelligence processing engine comprising a natural language processing engine being coupled to the information storage system, the natural language processing system being configured to:
        construct a plurality of occurrence vector spaces respectively representing the plurality of documents, each occurrence vector space indicating respective numbers of occurrences in the respective document of each of a plurality of words included in a curated list,
        generate a respective plurality of importance vector spaces for the plurality of documents from the plurality of occurrence vector spaces, each importance vector space including term frequency—inverse document frequency (tf-idf) values respectively corresponding to the numbers of occurrences in the respective occurrence vector spaces,
        determine a respective cosine similarity for each of the plurality of documents, each cosine similarity being between the importance vector space of the corresponding document and a reference vector space corresponding to a numbers of occurrences in a reference document of each of the plurality of words included in the curated list,
        select a document based upon the cosine similarity of the document, and
        transfer the selected document to the learning management system; and
    a configuration engine provided in the learning management system to populate the non-defined template with the selected document for the course to create a currently defined template using the selected document for the topic.

2. The system of claim 1 further comprising a display coupled to the configuring engine to view the selected document before configuring the selected document into the non-defined template.

3. The system of claim 1 wherein the selected document is a publication made within twenty four hours of processing the document using the learning content robot.

4. The system of claim 1 wherein the learning content robot comprises a graphical processing unit configured with the natural language processing engine.

5. The system of claim 1 further comprising a memory cache configured to store a plurality of selected documents in a temporary storage resource to be viewable in an order determined using the respective cosine similarities of the selected documents.

6. A method for using a learning content robot coupled to an information storage system to create a program for a learning process within a pre-determined time period, the method comprising:
    within the pre-determined time period,
    processing, using the learning content robot, a plurality of documents from an information management system, the plurality of documents being stored in one or more storage resources of an information storage system, the storage resources being coupled to a world wide network of computers;
    constructing a plurality of occurrence vector spaces respectively representing the plurality of documents, each occurrence vector space indicating respective numbers of occurrences in the respective document of each of a plurality of words included in a curated list,
    generating a respective plurality of importance vector spaces for the plurality of documents from the plurality of occurrence vector spaces, each importance vector space including term frequency-inverse document frequency (tf-idf) values respectively corresponding to the numbers of occurrences in the respective occurrence vector spaces,
    determining a respective cosine similarity for each of the plurality of documents, each cosine similarity being between the importance vector space of the corresponding document and a reference vector space corresponding to a numbers of occurrences in a reference document of each of the plurality of words included in the curated list;
    selecting a document from the plurality of documents based upon the cosine similarity of the document;
    transferring the selected document to a learning management system, the learning management system comprising the program related to the selected topic for a course, the program comprising a plurality of pre-defined templates for the course, and a plurality of non-defined templates for the course;

populating the selected document into the non-defined template using a configuration engine for the course to create a currently defined template using the selected document for the topic; and presenting the program with the selected document to a user of the learning management system.

7. The method of claim 6, further comprising displaying, on a display coupled to the learning management system, the selected document before configuring the selected document into the non-defined template.

8. The method of claim 6 wherein the selected document is a publication made within twenty four hours of processing the document using the learning content robot.

9. The method of claim 6 wherein the learning content robot comprises a graphical processing unit configured with the natural language processing engine.

10. The method of claim 6 further comprising storing the selected document in a memory cache configured to store a plurality of other selected documents in a temporary storage resource to be viewable in an order determined using the respective cosine similarities of the selected documents.

11. The method of claim 6 wherein the predetermined amount of time is 24 hours to perform the steps recited in claim 6.

12. The method of claim 6 further comprising storing the program in a storage archive, the storage archive having a plurality of archived programs.

13. A method for using a learning content robot coupled to an information storage system to create a program for a learning process within a pre-determined time period, the method comprising:

within the pre-determined time period of twenty four hours, processing, using the learning content robot, a plurality of documents from an information management system, the plurality of documents being stored in one or more storage resources of an information storage system, the storage resources being coupled to a world wide network of computers;

constructing a plurality of occurrence vector spaces respectively representing the plurality of documents, each occurrence vector space indicating respective numbers of occurrences in the respective document of each of a plurality of words included in a curated list, generating a respective plurality of importance vector spaces for the plurality of documents from the plurality of occurrence vector spaces, each importance vector space including term frequency-inverse document frequency (tf-idf) values respectively corresponding to the numbers of occurrences in the respective occurrence vector spaces, determining a respective cosine similarity for each of the plurality of documents, each cosine similarity being between the importance vector space of the corresponding document and a reference vector space corresponding to a numbers of occurrences in a reference document of each of the plurality of words included in the curated list selecting a document from the plurality of documents based upon cosine similarity of the document;

transferring the selected document to a learning management system, the learning management system comprising the program related to the selected topic for a course, the program comprising a plurality of pre-defined templates for the course, and a plurality of non-defined templates for the course;

populating the selected document into the non-defined template using a configuration engine for the course to create a currently defined template using the selected document for the topic; and presenting the program with the selected document to a user of the learning management system within the pre-determined time of twenty four hours.

14. The method of claim 13 further comprising displaying the selected document on a display coupled to the learning management system before configuring the selected document into the non-defined template.

15. The method of claim 13 wherein the selected document is a publication made within twenty four hours of processing the document using the learning content robot.

16. The method of claim 13 wherein the learning content robot comprises a graphical processing unit configured with the natural language processing engine.

17. The method of claim 13 further comprising storing the selected document in a memory cache configured to store a plurality of other selected documents in a temporary storage resource to be viewable in an order determined using the respective cosine similarities of the selected documents.

* * * * *